(12) United States Patent
White

(10) Patent No.: US 9,479,501 B2
(45) Date of Patent: *Oct. 25, 2016

(54) METHODS AND SYSTEMS FOR ENHANCING THE ACCURACY PERFORMANCE OF AUTHENTICATION SYSTEMS

(71) Applicant: Daon Holdings Limited, George Town (KY)

(72) Inventor: Conor Robert White, Fairfax, VA (US)

(73) Assignee: DAON HOLDINGS LIMITED, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,957

(22) Filed: May 6, 2016

(65) Prior Publication Data

US 2016/0285867 A1    Sep. 29, 2016

Related U.S. Application Data

(63) Continuation of application No. 14/467,111, filed on Aug. 25, 2014, now Pat. No. 9,363,265, which is a continuation of application No. 13/543,143, filed on Jul. 6, 2012, now Pat. No. 8,850,534.

(51) Int. Cl.
   *H04L 29/06*    (2006.01)
(52) U.S. Cl.
   CPC ........... *H04L 63/0861* (2013.01); *H04L 63/10* (2013.01)
(58) Field of Classification Search
   CPC . H04L 63/0861; H04L 9/3231; G06F 21/32; G10L 17/24; H04W 12/06
   See application file for complete search history.

(56) References Cited

U.S. PATENT DOCUMENTS

| | | | |
|---|---|---|---|
| 6,795,533 B2 | 9/2004 | Erb et al. | |
| 7,054,811 B2 | 5/2006 | Barzilay | |
| 7,158,776 B1 | 1/2007 | Estes et al. | |
| 7,212,613 B2 | 5/2007 | Kim et al. | |
| 7,289,957 B1 * | 10/2007 | Grashey | G10L 17/24 704/246 |
| 7,721,109 B1 | 5/2010 | Herder | |
| 8,345,829 B2 | 1/2013 | Kim et al. | |
| 8,499,342 B1 | 7/2013 | Macwan | |
| 8,751,233 B2 | 6/2014 | Bansal et al. | |
| 9,424,845 B2 * | 8/2016 | Weng | G10L 17/22 |
| 2004/0153337 A1 | 8/2004 | Cruze | |
| 2006/0085189 A1 | 4/2006 | Dalrymple et al. | |
| 2010/0106502 A1 | 4/2010 | Farrell et al. | |
| 2010/0131273 A1 | 5/2010 | Aley-Raz et al. | |
| 2012/0253809 A1 | 10/2012 | Thomas et al. | |
| 2013/0132091 A1 | 5/2013 | Skerpac | |

OTHER PUBLICATIONS

Extended European Search Report for EPO Application No. 13173673.8, dated Oct. 8, 2013, pp. 1-6.
Meyers, Lisa, An Exploration of Voice Biometrics, Sans Institute, Apr. 19, 2004, 17 pages.
Miller, Daniel, Voice Biometric Authentication Best Practices: Overcoming Obstacles to Adoption, Opus Research, Inc., Jan. 2012, pp. 1-15.

* cited by examiner

*Primary Examiner* — Minh Dinh
(74) *Attorney, Agent, or Firm* — Kevin McDermott, Esq.

(57) ABSTRACT

A method for enhancing the accuracy performance of authentication systems includes determining an authentication data requirement for a desired transaction and at least one new verification phrase. The method also includes capturing authentication data from a user with a communications device in accordance with the authentication data requirement, and capturing biometric data of the at least one new verification phrase from the user with the communications device. Moreover, the method includes adding the determined at least one new verification phrase to an enrollment phrase registry and storing the biometric data captured for the at least one new verification phrase in an enrollment data record of the user after successfully authenticating the user.

9 Claims, 6 Drawing Sheets

| No. | ENROLLMENT PHRASES |
|---|---|
| 24-1 | My voice is my passport verify me |
| 24-2 | There is too much sugar in my juice |
| 24-3 | Soccer is a popular sport |
| 24-4 | Most families have a dog or cat as a pet |
| 24-5 | Smart phones are a wonderful innovation |
| 24-6 | The weather is warm during the summer |
| 24-7 | The hills are alive with the sound of music |
| 24-8 | The rain in Spain stays mainly in the plain |

FIG. 2

| No. | VERIFICATION PHRASES |
|---|---|
| 24-1 | My voice is my passport verify me |
| 24-7 | The hills are alive with the sound of music |
| 24-8 | The rain in Spain stays mainly in the plain |

| No. | NEW VERIFICATION PHRASES |
|---|---|
| 28-1 | In Hertford, Hereford, and Hampshire hurricanes hardly ever happen |
| 28-2 | The Baltimore Orioles are the Best Team In Professional Baseball |

| No. | UPDATED ENROLLMENT PHRASES |
|---|---|
| 24-1 | My voice is my passport verify me |
| 24-2 | There is too much sugar in my juice |
| 24-3 | Soccer is a popular sport |
| 24-4 | Most families have a dog or cat as a pet |
| 24-5 | Smart phones are a wonderful innovation |
| 24-6 | The weather is warm during the summer |
| 24-7 | The hills are alive with the sound of music |
| 24-8 | The rain in Spain stays mainly in the plain |
| 28-1 | In Hertford, Hereford, and Hampshire hurricanes hardly ever happen |
| 28-2 | The Baltimore Orioles are the Best Team In Professional Baseball |

FIG. 5

METHODS AND SYSTEMS FOR ENHANCING THE ACCURACY PERFORMANCE OF AUTHENTICATION SYSTEMS

CROSS-REFERENCE TO RELATED APPLICATIONS

This is a continuation application of U.S. patent application Ser. No. 14/467,111, filed Aug. 25, 2014, which is a continuation application of U.S. patent application Ser. No. 13/543,143, filed Jul. 6, 2012, now U.S. Pat. No. 8,850,534, issued Sep. 30, 2014, the disclosures of which are incorporated herein by reference.

BACKGROUND OF THE INVENTION

This invention relates generally to conducting network-based authentication transactions, and more particularly, to methods and systems for enhancing the accuracy performance of authentication systems that conduct network-based authentication transactions.

The identity of a user may be verified using biometric data captured during network-based authentication transactions. Authentication systems that conduct network-based authentication transactions based on voice biometric data typically require users to recite a phrase which is used to verify the identity of the user. Such authentication systems have been known to prompt all individuals to recite the same phrase. However, imposters have been known to surreptitiously obtain voice biometric data of users and to impersonate users during remotely conducted network-based biometric authentication transactions by providing a false claim of identity supported by fraudulent biometric data in an effort to deceive an authenticating entity into concluding that the imposter is the person they claim to be. Such impersonations are known as spoofing.

Impostors currently use many methods to obtain or create fraudulent biometric data of others that can be submitted during authentication transactions. For voice biometric data imposters have been known to eavesdrop on networks during legitimate network-based biometric authentication transactions to surreptitiously obtain genuine voice biometric data of users reciting the requested phrase. The imposters then use the obtained biometric data for playback during fraudulent network-based authentication transactions. Such fraudulent biometric data are known to be difficult to detect using known liveness detection methods. Verifying that the biometric data presented during a network-based authentication transaction conducted at a remote location is from a live person at the remote location, is known as liveness detection or anti-spoofing.

Methods of liveness detection have been known to use text independent voice recognition techniques in an effort to prevent imposters from conducting fraudulent transactions with surreptitiously obtained voice biometric data. However, authentication systems that authenticate based on text independent voice recognition techniques frequently generate inaccurate results and thus have unacceptably low biometric authentication accuracy rates of performance.

BRIEF DESCRIPTION OF THE INVENTION

In one aspect, a method for enhancing the accuracy performance of authentication systems includes determining an authentication data requirement for a desired transaction and at least one new verification phrase. The method also includes capturing authentication data from a user with a communications device in accordance with the authentication data requirement, and capturing biometric data of the at least one new verification phrase from the user with the communications device. Moreover, the method includes adding the determined at least one new verification phrase to an enrollment phrase registry and storing the biometric data captured for the at least one new verification phrase in an enrollment data record of the user after successfully authenticating the user.

In another aspect, a computer system for enhancing the accuracy of authentication transaction results includes a service provider system engaged in controlling access to resources. The service provider system contains a database and is configured to conduct transactions regarding the resources. Moreover, the system includes a communications device configured to communicate with the service provider system over a network and to capture biometric data. The computer system also includes an authentication system including an authentication database.

The authentication system is configured to communicate with the service provider system and the communications device over the network. Moreover, the authentication system is configured to store enrollment data records and an enrollment phrase registry, determine the liveness of users communicating a desire to conduct a network-based transaction with the service provider system, and to determine at least one new verification phrase for the network-based transaction. Furthermore, the authentication system is configured to add the determined at least one new verification phrase to the enrollment phrase registry, and store biometric data captured for the at least one new verification phrase in the enrollment data record of the user.

In yet another aspect, a computer program recorded on a non-transitory computer-readable recording medium is provided. The computer program is included in an accuracy enhancing authentication computer system and is for enhancing the accuracy of network-based authentication transaction results. Moreover, the computer program is comprised of instructions, which when read and executed by the accuracy enhancing authentication computer system, cause the accuracy enhancing authentication computer system to determine at least one enrollment phrase from an enrollment phrase registry. The at least one enrollment phrase is an authentication data requirement.

Furthermore, the computer program causes the accuracy enhancing computer system to determine at least one new verification phrase, and determine that biometric data captured for the at least one new verification phrase corresponds to the determined at least one new verification phrase after successfully authenticating the user. The computer program also causes the accuracy enhancing computer system to add the determined at least one new verification phrase to an enrollment phrase registry and store the biometric data captured for the at least one new verification phrase in an enrollment data record of the user.

BRIEF DESCRIPTION OF THE DRAWINGS

FIG. 2 is a diagram illustrating an example enrollment phrase registry;

FIG. 3 is a diagram illustrating an example verification phrase registry;

FIG. 4 is a diagram illustrating an example new verification phrase registry;

FIG. 5 is a diagram illustrating an example updated enrollment phrase registry;

DETAILED DESCRIPTION OF THE INVENTION

Figure 1:
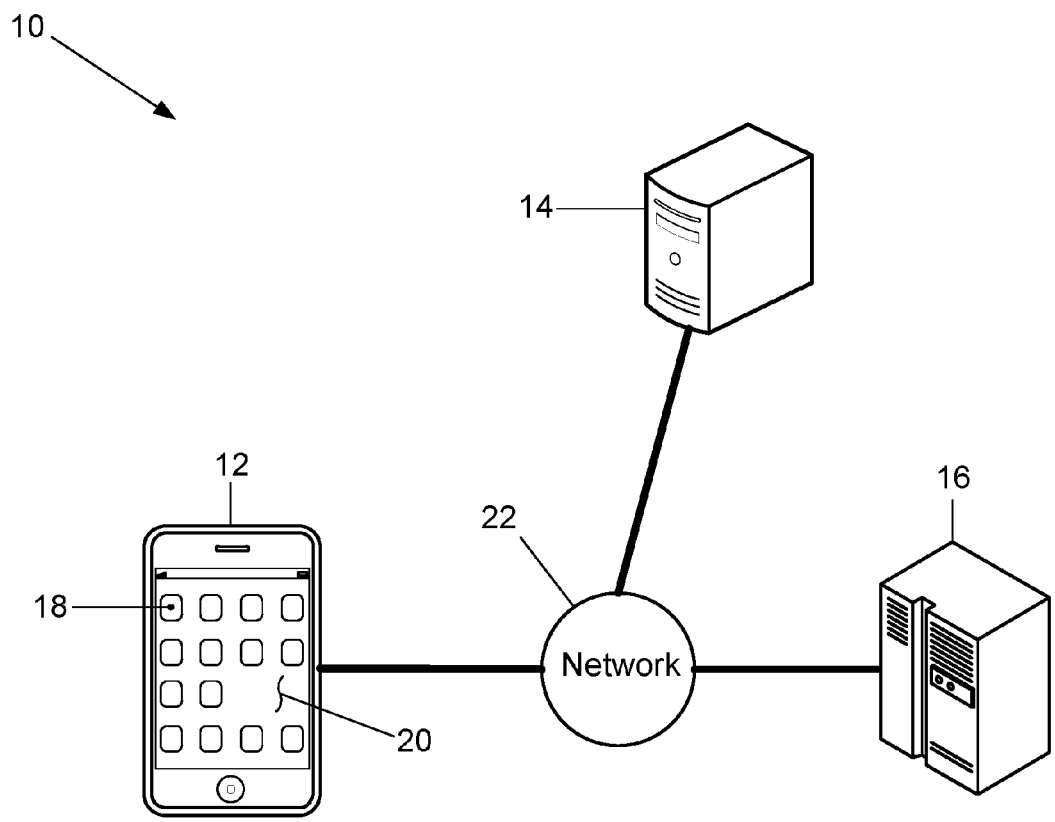
FIG. 1 is a block diagram of an example embodiment of an Accuracy Enhancing Authentication Computer system for enhancing the accuracy of authentication transaction results.

FIG. 1 is an expanded block diagram of an example embodiment of an Accuracy Enhancing Authentication Computer (AEAC) System 10 for enhancing the accuracy of authentication transaction results. More specifically, the AEAC system 10 includes a communications device 12, a Service Provider Computer (SPC) system 14, and a Biometric Authentication Computer (BAC) System 16. The device 12 is associated with a user.

The communications device 12 is a smart phone that stores applications and data therein, and displays at least one of text and images. The device 12 may include at least one of buttons and icons 18 for at least entering commands and invoking applications stored therein, and a display screen 20 such as, but not limited to, a Liquid Crystal Display (LCD) that displays at least one of text and images. Moreover, the device 12 may include cameras (not shown) and a microphone (not shown). The applications may cause the device 12 to perform at least the functions described herein.

Although the device 12 is a smart phone in the example AEAC system 10, the device 12 may alternatively be any device capable of at least storing data, displaying at least one of text and images, and capturing and transmitting data. Such other devices include, but are not limited to, a portable cellular phone, a tablet computer, a laptop computer, a personal computer, any type of portable communications device having wireless capabilities such as a personal digital assistant (PDA), entertainment devices and game playing consoles. Entertainment devices include, but are not limited to, televisions, and game playing consoles include, but are not limited to, the Xbox 360 and the Nintendo Wii.

The device 12 is configured to communicate with the SPC system 14, the BAC system 16, other systems (not shown), and devices (not shown) over a communications network 22. The communications network 22 is a 4G communications network. Alternatively, the communications network 22 may be any wireless network including, but not limited to, 3G, Wi-Fi, Global System for Mobile (GSM), Enhanced Data for GSM Evolution (EDGE), and any combination of a local area network (LAN), a wide area network (WAN) and the Internet.

The device 12 may be used to capture biometric data during authentication transactions and transmit the captured biometric data to the BAC system 16. Furthermore, the device 12 may process the captured biometric data prior to transmitting it to the BAC system 16. For example, the device 12 may capture biometric data, create a biometric template from the captured data, and then transmit the biometric template to the BAC system 16. Although the AEAC system 10 includes one device 12, the AEAC system 10 may alternatively include any number of devices 12 that are each associated with a same or different user.

The SPC system 14 is a computer system that stores and controls access to resources and conducts transactions regarding the resources. Resources include any kind of data that is protected against access by unauthorized users. Such resources include, but are not limited to, electronic artifacts, services and applications.

As described herein the SPC system 14 is associated with a financial institution. Thus, the SPC system 14 is configured to store and control access to at least the financial accounts for each of a plurality of financial institution customers, and facilitates conducting transactions involving the financial accounts. Moreover the SPC system 14 is configured to communicate with the device 12, the BAC system 16, other systems (not shown), and other devices (not shown) over the network 22. Although the SPC system 14 is associated with a financial institution the SPC system 14 is in no way limited to being associated with a financial institution. Alternatively, the SPC system 14 may be associated with any type of business or entity such as a merchant that sells merchandise from its web site over the network 22. The SPC system 14 may also function to implement a virtual private network for any type of business or entity that protects access to resources such as, but not limited to, electronic files, electronic documents, and electronic media. Electronic media includes, but is not limited to, movies. Although the AEAC system 10 includes one SPC system 14 associated with a financial institution, the AEAC system 10 may alternatively include a plurality of SPC systems 14 that are each associated with a different business or entity.

The BAC system 16 includes components such as, but not limited to, a web server, a database server, an application server, a directory server and a disk storage unit that may be used to store any kind of data. The disk storage unit may store at least one database such as, but not limited to, an authentication database. The application server stores applications therein that cause the BAC system 16 to perform the functions described herein. The BAC system 16 also includes a database management server and an authentication server. The database management server may be used to facilitate transferring data to and from the disk storage device. The authentication server performs matching of any feature or information associated with users to authenticate the identity of users during authentication transactions as described herein. The BAC system 16 is also configured to communicate with the device 12, the SPC system 14, other systems (not shown), and devices (not shown) over the network 22.

The authentication database stores at least authentication data of each of a plurality of users in enrollment data records. The authentication data may be any kind of information that may be used to authenticate users such as, but not limited to, biometric data, Global Positioning System (GPS) coordinates, and pass-phrases, and any combination of biometric data, GPS coordinates, and pass-phrases. Biometric data may correspond to any biometric characteristic desired to be used as the basis of authenticating a user. Such biometric characteristics include, but are not limited to, voice, face, finger, iris, palm, and electrocardiogram, and any combination of voice, face, finger, iris, palm, and electrocardiogram. The biometric data may take any form such as, but not limited to, audio recordings and photographic images.

The enrollment data record of each authorized user stored in the BAC system 16 includes data such as, but not limited to, enrollment biometric data, enrollment biometric templates, and personal data. Enrollment biometric data is raw biometric data obtained from the user during enrollment in the BAC system 16. The enrollment biometric data for each user is processed during enrollment to generate at least one enrollment biometric template, for each respective user, which is used by the BAC system 16 to conduct authentication transactions. Biometric data captured from users during authentication transactions may also be stored in the enrollment data record of the user. Moreover, biometric data captured during authentication transactions may be processed into biometric template data, included in the enrollment data record of the user, and used to conduct authentication transactions. Personal data includes any demographic information regarding an individual including, but not limited to, an individual's name, age, date-of-birth, address, citizenship and marital status. Each enrollment data record may also include any kind of data that may be used to authenticate the identity of users as described herein.

Although biometric data is captured from each user during enrollment in the BAC system 16, biometric data may alternatively be obtained by other methods such as, but not limited to, automatically reading or extracting the biometric data from identity documents or from legacy databases included in other computer systems. Likewise, biometric templates corresponding to the biometric data may be obtained by other methods such as, but not limited to, automatically reading or extracting the biometric templates from identity documents or from legacy databases included in other computer systems. Templates corresponding to desired biometric data may be obtained in addition to, or instead of, the desired biometric data itself. Such other legacy database systems include, but are not limited to, systems associated with motor vehicle administrations, social security administrations, welfare system administrations, financial institutions and health care providers. Such identity documents include, but are not limited to, passports and driver's licenses. By extracting desired biometric data or biometric templates from a legacy database or identity document, and storing the extracted data in the BAC system 16, users may be enrolled therein without having to directly provide biometric data.

The BAC system 16 may also store configurable authentication policies, some of which may be used to determine data that is to be captured or obtained from users during enrollment in the BAC system 16, and others which may be used to determine an authentication data requirement. The authentication data requirement is the authentication data desired to be captured from users during authentication transactions. Such authentication policies may determine the authentication data requirement based on factors such as, but not limited to, the risk associated with a desired network-based transaction. The BAC system 16 may determine the authentication data requirement by randomly selecting the authentication data requirement from such authentication policies. Moreover, the BAC system 16 may determine the authentication data requirement by executing algorithms. For example, the BAC system 16 may execute an algorithm which determines a least recently used authentication data requirement as the authentication data requirement for an authentication transaction. The BAC system 16 may determine the authentication data requirement in any manner.

The device 12, the SPC system 14, and the BAC system 16, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the device 12, the SPC system 14, and the BAC system 16. The above examples are not intended to limit in any way the definition and/or meaning of the term "processor."

The respective memories (not shown) in the device 12, the SPC system 14, and the BAC system 16 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the device 12, the SPC system 14, and the BAC system 16. Moreover, each of the respective memories (not shown) can be a computer-readable recording medium used to store computer programs or executable instructions that are executed, respectively, by the device 12, the SPC system 14, and the BAC system 16. Furthermore, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

FIG. 2 is a diagram illustrating an example enrollment phrase registry 24 stored in the BAC system 16 that includes phrases for facilitating capturing text dependent voice biometric data to be used in text dependent speaker recognition authentication techniques. More specifically, the phrase registry 24 includes phrases 24-1 to 24-8 that are recited by users during enrollment in the BAC system 16, which recitations are stored as enrollment biometric data in the enrollment data records of the respective users. Thus, the phrases 24-1 to 24-8 are used to facilitate generating and storing voice biometric data of each user in the BAC system 16 that can be used for conducting text-dependent authentication transactions. Because text-dependent authentication techniques are inherently more accurate than text-independent authentication techniques, reciting any one of, or any combination of, the phrases 24-1 to 24-8 during an authentication transaction facilitates increasing the accuracy of voice biometric data authentication results. The authentication data requirement is displayed in the screen 20 for the user to see. Consequently, when the authentication data requirement is voice biometric data, any one of, or any combination of, the enrollment phrases included in the registry 24 may be displayed on the screen 20.

Although eight phrases are included in the enrollment phrase registry 24, the phrase registry 24 may alternatively include any number of different phrases that facilitate increasing the accuracy of authentication transaction results as described herein. Moreover, phrases may be added to the registry 24 subsequent to enrollment.

FIG. 3 is a diagram illustrating an example verification phrase registry 26 stored in the BAC system 16 that includes the authentication data requirement for an authentication transaction. More specifically, the verification phrase registry 26 includes phrases 24-1, 24-7, and 24-8 from the enrolment phrase registry 24 that a user is to recite and capture as biometric data during an authentication transaction. The BAC system 16 determines which phrases from the enrollment phrase registry 24 are to be the authentication data requirement and thus included in the registry 26. The authentication data requirement for each authentication transaction is different. Consequently, the phrases included in the registry 26 are different for each authentication transaction. Although the verification phrase registry 26 includes three phrases, the phrase registry 26 may alternatively include any number of phrases from the enrollment phrase registry 24. It should be appreciated that only enrollment phrases included in the enrollment phrase registry 24, that have corresponding biometric data stored in the enrollment data record of a user, may be included in the verification phrase registry 26.

Because the enrollment phrase is different for each authentication transaction, the biometric data to be captured is not known in advance to an imposter and thus appears unpredictable. Consequently, due to the number of different combinations of enrollment phrases that may be determined by the BAC system 16, the determined enrollment phrases constitute an unpredictable condition injected into biometric authentication transactions by the BAC system 16 that facilitate making it more difficult for imposters to successfully spoof the BAC system 16. An unpredictable condition is a condition required for successful authentication that an imposter cannot effectively accurately anticipate.

FIG. 4 is a diagram illustrating an example new verification phrase registry 28 including new verification phrases 28-1 and 28-2, not included in the enrollment phrase registry 24 that may be recited by a user before, during, or after an authentication transaction. The new verification phrases are not part of the authentication data requirement. After successfully authenticating a user and confirming that the user properly recited and captured the new verification phrases, captured biometric data of the new verification phrases may be added to the enrollment data record of the user, and the new verification phrases themselves may be added to the enrollment phrase registry 24 as enrollment phrases to thus update the enrollment phrase registry 24.

The BAC system 16 uses policies stored therein to determine which new verification phrases are to be included in the new verification phrase registry 28. Although the new verification phrase registry 28 includes two new verification phrases 28-1 and 28-2, the new verification phrase registry 28 may alternatively include any number of new verification phrases. Each of the new verification phrases are different from the phrases included in the enrollment phrase registry 24. Moreover, it should be understood that the BAC system 16 may alternatively determine that new verification phrases are not to be included in the new verification phrase registry 28.

The information shown in FIG. 5 is the same information shown in FIG. 2 as described in more detail below. As such, features illustrated in FIG. 5 that are identical to features illustrated in FIG. 2 are identified using the same reference numerals used in FIG. 2.

FIG. 5 is a diagram illustrating an example updated enrollment phrase registry 30. More specifically, the updated enrollment phrase registry 30 includes the same enrollment phrases 24-1 to 24-8 included in the enrollment phrase registry 24, as well as the new verification phrases 28-1 and 28-2. It should be appreciated that by virtue of increasing the number of phrases in the enrollment phrase registry 24 that may be determined by the BAC system 16 for inclusion in the verification phrase registry 26, it is more difficult for an imposter to surreptitiously obtain the authentication data requirement for conducting a successful authentication transaction. As a result, the trustworthiness of authentication transaction results is facilitated to be increased, the accuracy performance of authentication systems is facilitated to be enhanced, and the incidence of fraudulent transactions conducted by imposters is facilitated to be reduced.

Figure 6:
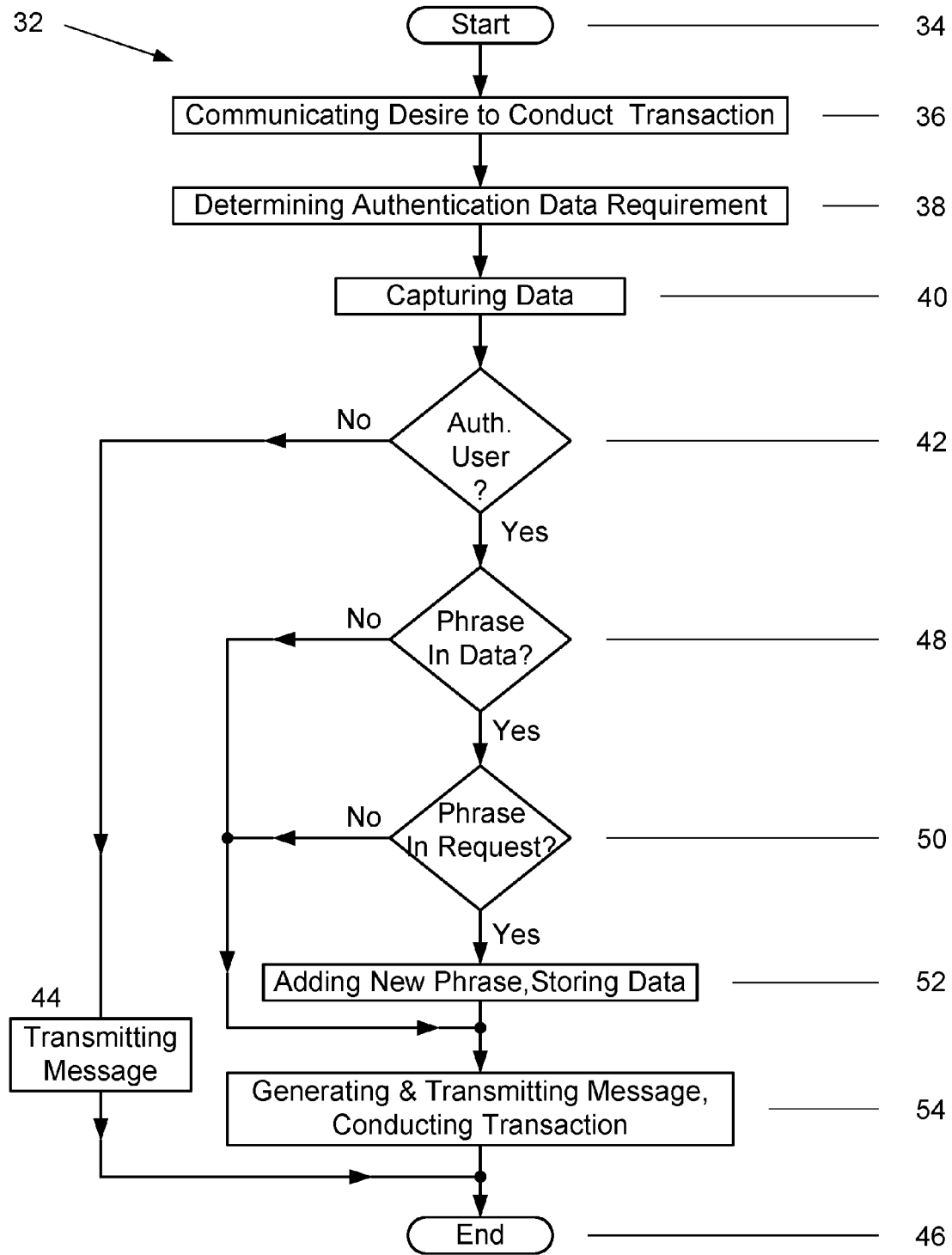
FIG. 6 is a flowchart illustrating an example process for enhancing the accuracy performance of authentication systems.

FIG. 6 is a flowchart 32 illustrating an example process for enhancing the accuracy performance of authentication systems. For AEAC system 10, the process starts 34 with a user operating his device 12 communicating a desire to conduct a network-based transaction 36 with the SPC system 14. Next, the SPC system 14 continues processing by communicating an authentication request message to the BAC system 16.

After receiving the authentication request message, the BAC system 16 continues processing by determining the authentication data requirement 38 for the desired network-based transaction. More specifically, the BAC system 16 continues processing by determining at least one of the enrollment phrases 24-1 to 24-8 to use as the authentication data requirement. The authentication data requirement is the verification phrases 24-1, 24-7, and 24-8. Next, the BAC system 16 continues by generating a data capture request message that includes the authentication data requirement, and transmitting the data capture request message to the device 12. The BAC system 16 may also determine a new verification phrase to include in the data capture request message. The device 12 continues processing by displaying the authentication data requirement for the user to see. After reading the authentication data requirement, the user continues by capturing authentication data 40 from his self with the device 12 in accordance with the authentication data requirement. If the data capture request message includes a new verification phrase, the user also captures biometric data 40 from his self corresponding to the new verification phrase.

The device 12 continues processing by automatically transmitting the captured authentication data to the BAC system 16. Alternatively, the user may manually control transmission of the captured authentication data by operating a button 18 of the device 12. When biometric data corresponding to a new verification phrase is captured, the new verification phrase biometric data is also transmitted to the BAC system 16 with the captured authentication data. After receiving the captured data, the BAC system 16 continues processing by authenticating the user 42. More specifically, the BAC system 16 determines whether the captured authentication data matches the stored authentication data of the user. When the captured authentication data does not match the stored authentication data of the user, processing continues by transmitting a message 44 to the device 12 notifying the user that because of the unsuccessful authentication the desired network-based transaction cannot be conducted. Next, processing ends 46. However, when the captured authentication data matches the stored authentication data of the user, the identity of the user is successfully authenticated 42.

After successfully authenticating the user 42, the BAC system 16 continues by determining whether captured biometric data of a new verification phrase is included in the received data 48. If so, the BAC system 16 continues processing by determining whether the data capture request message included a new verification phrase 50. If so, processing continues by adding the new verification phrase 52 to the enrollment phrase registry 24, and storing the new verification phrase biometric data 52 in the enrollment data record of the user. By virtue of adding the new verification phrase in the enrollment phrase registry 24, the enrollment phrase registry 24 is updated. Next, the BAC system 16 continues by generating and transmitting a message 54 to the device 12 notifying the user that he is permitted to conduct the desired network-based transaction with the SPC system 14. After reading the message from the device 12, the user continues by conducting the desired network-based transaction 54. Next, processing ends 46.

When the received data does not include a new verification phrase 48, the BAC system 16 continues processing by generating and transmitting a message 54 to the device 12 notifying the user that he is permitted to conduct the desired network-based transaction with the SPC system 14. After reading the message from the device 12, the user continues by conducting the desired network-based transaction 54. Next, processing ends 46. Likewise, when the data capture request message does not include a new verification phrase 50 processing continues by conducting operation 54 and then processing ends 46.

Figure 7:
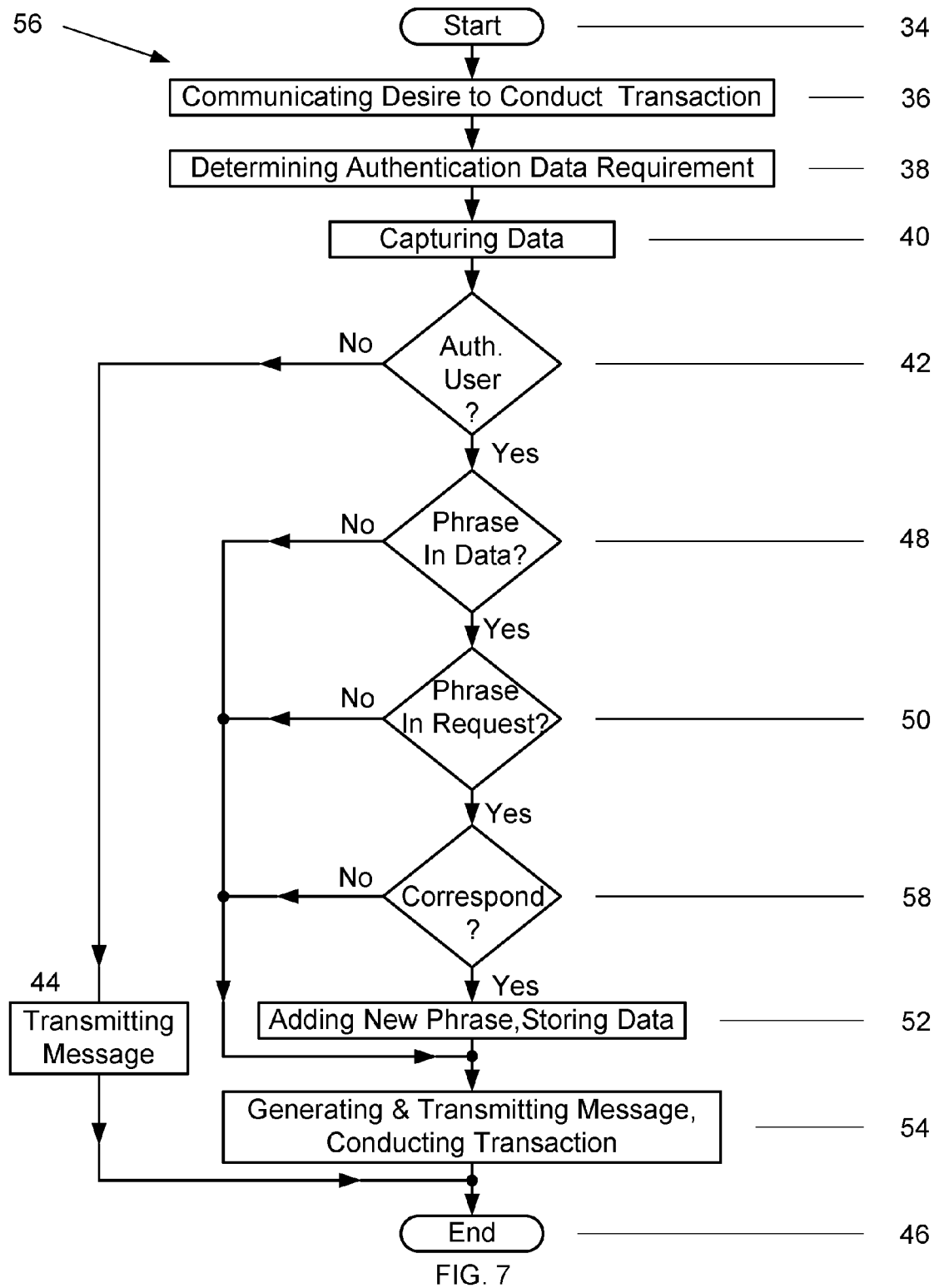
FIG. 7 is a flowchart illustrating an alternative example process for enhancing the accuracy performance of authentication systems.

The information shown in FIG. 7 is the same information shown in FIG. 6 as described in more detail below. As such, features illustrated in FIG. 7 that are identical to features illustrated in FIG. 6 are identified using the same reference numerals used in FIG. 6.

FIG. 7 is a flowchart 56 illustrating an alternative example process used by the AEAC system 10 for enhancing the accuracy performance of authentication systems. This alternative process is similar to that shown in FIG. 6. However, after determining that a new verification phrase was included in the data capture request message 50, processing continues by determining 58 whether the received new verification phrase biometric data corresponds to the new verification phrase included in the data capture request message. When it is determined 58 that the received verification phrase biometric data corresponds 58 to the verification phrase included in the data capture request message, processing continues by conducting operation 52. Otherwise, processing continues by conducting operation 54 and then processing ends 46.

Figure 8:
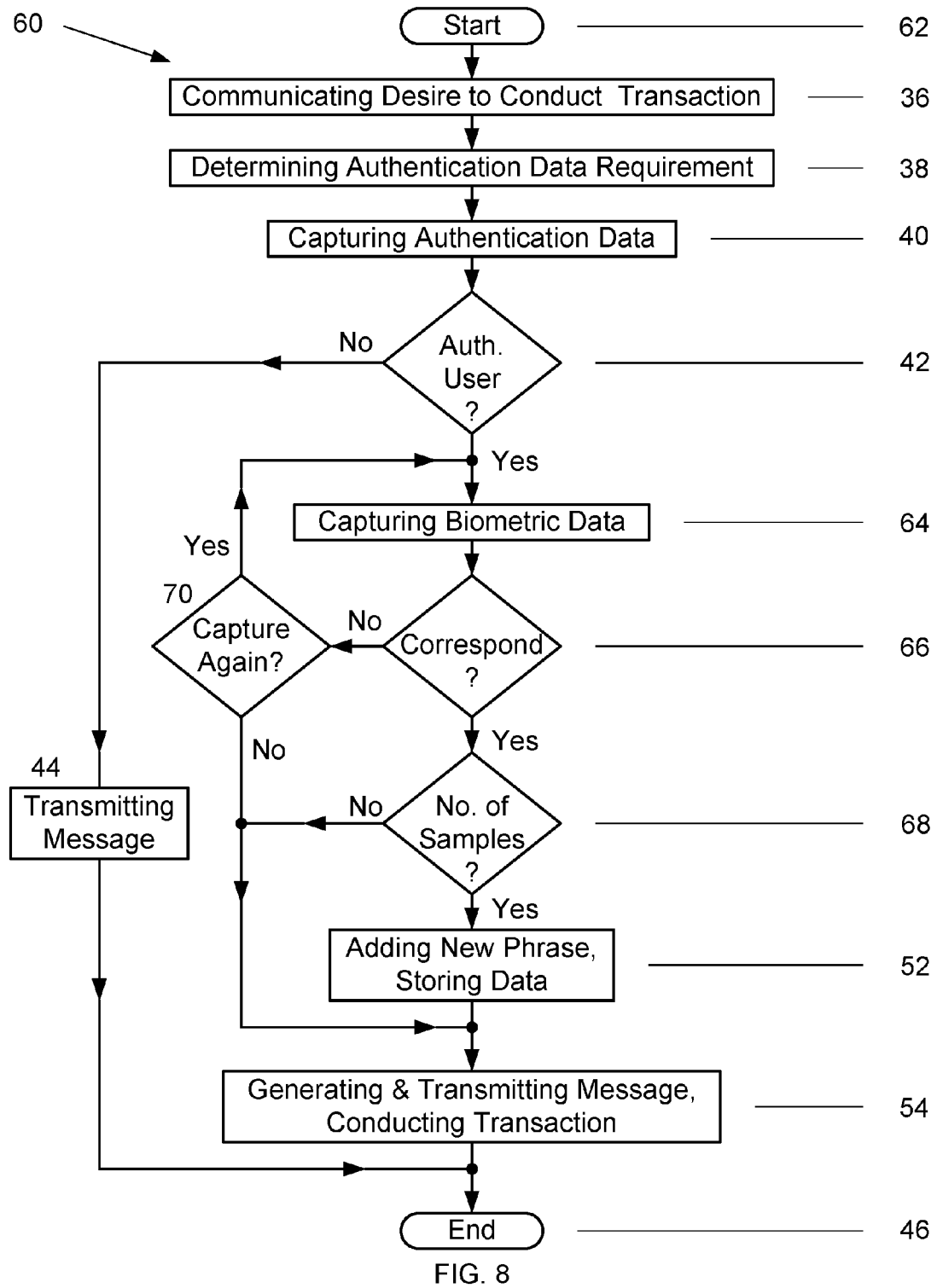
FIG. 8 is a flowchart illustrating another alternative example process for enhancing the accuracy performance of authentication systems.

The information shown in FIG. 8 is the same information shown in FIG. 7 as described in more detail below. As such, features illustrated in FIG. 8 that are identical to features illustrated in FIG. 7 are identified using the same reference numerals used in FIG. 7.

FIG. 8 is a flowchart 60 illustrating another alternative example process used by the AEAC system 10 for enhancing the accuracy performance of authentication systems. This alternative process is similar to that shown in FIG. 7. However, biometric data of a new verification phrase is captured after successfully authenticating the user. Moreover, operation 52 is not conducted until a specified number of successful authentication transactions occur.

For the AEAC system 10, this alternative example process starts 62 with a user, operating his device 12 communicating a desire to conduct a network-based transaction 36 with the SPC system 14. Next, the SPC system 14 continues processing by communicating an authentication request message to the BAC system 16. After receiving the authentication request message, the BAC system 16 continues processing by determining the authentication data requirement 38 for the desired network-based transaction. After receiving the authentication data requirement from the BAC system 16, the device 12 continues processing by displaying the authentication data requirement for the user to see. After reading the authentication data requirement, the user continues by capturing authentication data 40 from his self with the device 12 in accordance with the authentication data requirement.

Next, processing continues by transmitting the captured authentication data to the BAC system 16. After receiving the captured authentication data, the BAC system 16 continues processing by conducting operation 42. After successfully authenticating 42 the user, the BAC system 16 continues by generating a verification data capture request message that includes a new verification phrase, and transmitting the verification data capture request message to the device 12.

The device 12 continues processing by displaying the new verification phrase for the user to see. After reading the new verification phrase, the user continues by capturing biometric data 64 of the new verification phrase from his self with the device 12. Next, the device 12 transmits the captured biometric data to the BAC system 16 which continues by determining 66 whether the received new verification phrase biometric data corresponds 66 to the new verification phrase included in the verification data capture request message. When it is determined 66 that the received biometric data corresponds 66 to the new verification phrase included in the verification data capture request message, the BAC system 16 continues processing by storing the received new verification phrase biometric data in the enrollment data record of the user as raw biometric data in the form of a voice sample.

Moreover, the BAC system 16 continues by determining the number of voice samples 68 of the new verification phrase stored in the enrollment data record of the user. When the number of voice samples is three, the BAC system 14 continues processing by adding 52 the new verification phrase to the enrollment phrase registry 24, generating a biometric data template from the three voice samples, and storing 52 the biometric template data for the new verification phrase in the enrollment data record of the user. Next, processing continues by conducting operation 54, then processing ends 46. However, when the number of voice samples 68 is less than three, processing continues by conducting operation 54 and then processing ends 46. Although the BAC system 14 conducts operation 52 when three voice samples of the new verification phrase are stored in the enrollment data record of the user, the number of voice samples may alternatively be any number.

When the received new verification phrase biometric data does not correspond 66 to the new verification phrase included in the verification data capture request message, the BAC system 16 continues by determining whether biometric data of the new verification phrase should be captured again 70. Biometric data of the new verification phrase may be captured three times in this alternative example process. However, in other alternative example processes, biometric data of the new verification phrase may be captured any number of times. When biometric data of the new verification phrase has not been captured three times, biometric data is to be captured again 70. Thus, processing continues by conducting operation 64. Otherwise, processing continues by conducting operation 54 and then processing ends 46.

Although biometric data of one new verification phrase is captured in the example processes described herein, in alternative processes biometric data of any number of new verification phrases may be captured.

By virtue of requiring users to authenticate against an authentication data requirement of a determined enrollment phrase, the AEAC system 10 effectively determines the liveness of users attempting to conduct network-based transactions. Users that are successfully authenticated are determined to be live while those that are not successfully authenticated are determined to be imposters attempting to conduct a fraudulent transaction with the SPC system 14.

It should be appreciated that determining any one of, or any combination of, the enrollment phrases 24-1 to 24-8 as the authentication data requirement, facilitates decreasing the probability that imposters will be able to accurately anticipate the authentication data requirement and thus successfully spoof the BAC system 16. Moreover, because the authentication data requirement is not known in advance the authentication data requirement appears unpredictable to an imposter. Consequently, due to the number of different combinations of enrollment phrases 24-1 to 24-8 that may be determined by the BAC system 16, the determined enrollment phrases constitute an unpredictable condition injected into biometric authentication transactions by the BAC system 16 that facilitate increasing the difficulty of successfully spoofing the BAC system 16.

Furthermore, it should be appreciated that increasing the number of enrollment phrases in the enrollment phrase registry 24 that may be determined by the BAC system 16 further facilitates decreasing the probability that imposters will be able to surreptitiously obtain a phrase or phrases required for fraudulently conducting an authentication transaction. As a result, the trustworthiness of authentication transaction results is facilitated to be increased, the accuracy performance of authentication systems is facilitated to be enhanced, and the incidence of fraudulent network-based transactions conducted by imposters is facilitated to be reduced.

In each embodiment, the above-described methods for enhancing the accuracy performance of authentication systems facilitate increasing the trustworthiness of authentication transaction results as well as facilitate reducing the number of fraudulent network-based transactions conducted by imposters. More specifically, authentication data of a determined verification phrase and biometric data of a new verification phrase are captured from a user. After successfully authenticating the user and determining that a data capture request message included a new verification phrase, the new verification phrase is stored in an enrolment phrase registry and the biometric data captured for the new verification phrase is stored in an enrollment data record of the user. The biometric data of the new verification phrase may be determined to correspond to the new verification phrase included in the data capture request message, prior to storing the new verification phrase and the new verification phrase biometric data. As a result, biometric authentication system operation facilitates reducing the time and cost associated with generating accurate authentication results, and facilitates enhancing the accuracy of authentication results. Accordingly, biometric authentication system performance is facilitated to be enhanced in a cost effective and reliable manner.

Example embodiments of methods for enhancing the accuracy performance of authentication systems are described above in detail. The methods are not limited to use with the specific authentication computer systems described herein, but rather, the methods can be utilized independently and separately from other authentication computer components described herein. For example, the methods for enhancing the accuracy performance of authentication systems described herein may be implemented in most authentication systems and may be used for a wide range of authentication scenarios, including unlocking the door to a secure facility. Moreover, the invention is not limited to the embodiments of the methods described above in detail. Rather, other variations of the methods may be utilized within the spirit and scope of the claims.

While the invention has been described in terms of various specific embodiments, those skilled in the art will recognize that the invention can be practiced with modification within the spirit and scope of the claims.

What is claimed is:

1. A computer-implemented method for enhancing the accuracy of authentication transaction results comprising:
    determining, by a processor, an authentication data requirement;
    capturing from a user authentication data in accordance with the authentication data requirement;
    determining liveness of the user based on the authentication data requirement; and
    after determining the user is live and successfully authenticating the user with the captured authentication data, adding, by the processor, at least one new verification phrase to an enrollment phrase registry.

2. A method in accordance with claim 1, said capturing step comprising capturing voice biometric data from the user while the user recites the authentication data requirement, the authentication data requirement being a phrase.

3. A method in accordance with claim 1, further comprising
    capturing voice biometric data for the at least one new verification phrase from the user during said capturing step; and
    storing the captured voice biometric data in a user enrollment data record after successfully authenticating the user.

4. A computing device for enhancing the accuracy of authentication transaction results comprising:
    a processor; and
    a memory configured to store an enrollment phrase registry, said computing device being associated with a network and said memory being in communication with said processor and having instructions stored therein which, when executed by said processor cause said computing device to:
    determine an authentication data requirement;
    capture from a user authentication data in accordance with the authentication data requirement;
    determine liveness of the user based on the authentication data requirement; and
    add at least one verification phrase to an enrollment phrase registry after determining the user is live and successfully authenticating the user with the captured authentication data.

5. A computing device in accordance with claim 4, wherein the instructions when executed by said processor further cause said computing device to capture voice biometric data from the user while the user recites the authentication data requirement, the authentication data requirement being a phrase.

6. A computing device in accordance with claim 4, wherein the instructions when executed by said processor further cause said computing device to:
    capture voice biometric data for the at least one verification phrase from the user; and store the captured voice biometric data in a user enrollment data record after successfully authenticating the user.

7. A non-transitory computer-readable storage medium having instructions stored thereon for enhancing the accuracy of authentication transaction results, the instructions when executed by a processor of a computing system cause the computing system to:

determine an authentication data requirement;
   capture from a user authentication data in accordance with the authentication data requirement;
   determine liveness of the user based on the authentication data requirement; and
   add at least one verification phrase to an enrollment phrase registry after determining the user is live and successfully authenticating the user with the captured authentication data.

8. The non-transitory computer-readable storage medium in accordance with claim 7, wherein the instructions when executed by the processor of the computing system further cause the computing system to capture voice biometric data from the user while the user recites the authentication data requirement, the authentication data requirement being a phrase.

9. The non-transitory computer-readable storage medium in accordance with claim 7, wherein the instructions when executed by the processor of the computing system further cause the computing system to:

capture voice biometric data for the at least one verification phrase from the user; and
   store the captured voice biometric data in a user enrollment data record after successfully authenticating the user.

* * * * *